United States Patent
Kuriyama et al.

(10) Patent No.: US 6,699,370 B2
(45) Date of Patent: Mar. 2, 2004

(54) PROCESS AND SYSTEM FOR DECOMPOSING POLLUTANTS

(75) Inventors: Akira Kuriyama, Kanagawa (JP); Kinya Kato, Kanagawa (JP); Masahiro Kawaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 88 days.

(21) Appl. No.: 09/880,760

(22) Filed: Jun. 15, 2001

(65) Prior Publication Data

US 2002/0017496 A1 Feb. 14, 2002

(30) Foreign Application Priority Data

Jun. 16, 2000 (JP) .......................... 2000-181636

(51) Int. Cl.[7] .............................................. B01D 45/00
(52) U.S. Cl. ................. 204/157.3; 204/158.2; 96/243; 96/256
(58) Field of Search .................... 204/157.3, 158.2; 96/243, 256, 355

(56) References Cited

U.S. PATENT DOCUMENTS

| 5,255,008 A | 10/1993 | Yoshida ........................ 346/24 |
| 5,308,507 A | 5/1994 | Robson ....................... 210/748 |
| 5,578,193 A | 11/1996 | Aoki et al. .................. 205/746 |
| 5,582,741 A | 12/1996 | Kenmoku et al. .......... 210/748 |
| 5,611,642 A | 3/1997 | Wilson ........................ 405/128 |
| 6,444,015 B2 * | 9/2002 | Kato |
| 6,497,795 B1 * | 12/2002 | Kato |

FOREIGN PATENT DOCUMENTS

| EP | 0 841 305 | 5/1998 |
| JP | 62-191025 | 8/1987 |
| JP | 62-191095 | 8/1987 |
| JP | 63-218293 | 9/1988 |
| JP | 1-180293 | 7/1989 |
| JP | 3-38297 | 2/1991 |
| JP | 5-269374 | 10/1993 |
| JP | 6-182151 | 7/1994 |
| JP | 7-51675 | 2/1995 |
| JP | 7-144137 | 6/1995 |
| JP | 8-257570 | 10/1996 |
| JP | 9-234338 | 9/1997 |

* cited by examiner

Primary Examiner—Betsey Morrison Hoey

(57) ABSTRACT

In a process for decomposing pollutants by bringing pollutants contained in air into contact with air that contains chlorine, under irradiation by light, at least part of a chlorine-generating solution present in a chlorine generation region is fed to a means for forming the functional water by electrolysis to effect regeneration and is again fed to the chlorine generation region. Also disclosed is a pollutant decomposition system used in such a process.

12 Claims, 3 Drawing Sheets

PROCESS AND SYSTEM FOR DECOMPOSING POLLUTANTS

BACKGROUND OF THE INVENTION

1. Field of the Invention

This invention relates to a process for decomposing pollutants (in particular, organochlorine compounds) and a pollutant decomposition system used therefor.

2. Related Background Art

With the development of industrial techniques until recent years, the use of organochlorine compounds such as ethylene chloride and methane chloride has been widespread. Disposal of these compounds has become a serious concern. Due to environmental problems caused by these pollutants, great efforts are being made to remediate these problems.

As methods for disposing of such pollutants, for example, methods are available in which ethylene chloride is decomposed with an oxidant or a catalyst. Stated specifically, known are a method in which it is decomposed with ozone (Japanese Patent Application Laid-Open No. 3-38297) and a method in which it is irradiated by ultraviolet rays in the presence of hydrogen peroxide (Japanese Patent Application Laid-Open No. 63-218293). It is also suggested to use sodium hypochlorite as an oxidizing agent (U.S. Pat. Nos. 5,525,008 and 5,611,642). Also proposed is a method in which sodium hypochlorite and ultraviolet irradiation are used in combination (U.S. Pat. No. 5,582,741). Another method is also known in which a photocatalyst comprised of fine semiconductor particles of an oxide such as titanium oxide and liquid ethylene chloride are suspended under an alkaline condition, and the suspension is irradiated by light to effect decomposition (Japanese Patent Application Laid-Open No. 7-144137).

In addition to the foregoing, methods of photodecomposition by ultraviolet irradiation in a gaseous phase without the use of any oxidizing agent have already been attempted. For example, proposed are a method in which a waste gas containing organohalogenated compounds is subjected to ultraviolet irradiation to convert it into an acidic decomposed gas, followed by washing with an alkali solution to make it harmless (Japanese Patent Application Laid-Open No. 62-191025), and a system in which waste water containing organohalogenated compounds is subjected to aeration and the gas being discharged is subjected to ultraviolet irradiation, followed by washing with an alkali solution (Japanese Patent Application Laid-Open No. 62-191095). It is also known to decompose ethylene chloride using iron powder (Japanese Patent Application Laid-Open No. 8-257570). In this case, it is presumed that reduction decomposition takes place. Reduction decomposition is also reported with respect to the decomposition of tetrachloroethylene (hereinafter abbreviated to "PCE") using fine silicon particles.

Chlorinated aliphatic hydrocarbons such as trichloroethylene (hereinafter abbreviated to "TCE") and PCE are known to be aerobically or anaerobically decomposed by microorganisms. Attempts have also been made to decompose or purify by utilizing such a process.

SUMMARY OF THE INVENTION

An object of the present invention is to provide a decomposition process that does not require any treatment with activated carbon or microorganisms and by which pollutants can be decomposed efficiently, without causing any secondary pollution on account of the use of air, which contains chlorine and may also produce a small quantity, of waste water; and an efficient pollutant decomposition system employing such a process.

To achieve the above object, the present inventors conducted extensive studies. As a result, they have reached a new finding that superior decomposition power can be achieved by subjecting functional water (e.g., acidic water) to aeration to form air that contains chlorine, and mixing this air with air that contains pollutants such as organochlorine compounds, followed by photodecomposition. The functional water is obtained by electrolysis of water that is reported to have a microbicidal effect (Japanese Patent Application Laid-Open No. 1-80293) or the effect of cleaning contaminants present on semiconductor wafers (Japanese Patent Application Laid-Open No. 7-51675).

In the course of continued, detailed experiments to explore any practically desirable form, it was also discovered that in order to conduct a simpler and more efficient decomposition, it is effective to carry out electrolysis on a functional water waste liquor formed in the course of aeration or after the aeration and to form functional water that is again usable as a chlorine feed source. Thus, the water can be reused to carry out the decomposition, making it possible to greatly cut down the quantity of waste water and that of the electrolyte to be added. Accordingly, the present invention has been accomplished.

More specifically, the present invention provides a process for decomposing pollutants by bringing pollutants contained in air into contact with air that contains chlorine under irradiation by light, the process comprising:

a chlorine-containing air generation step of generating air which contains chlorine, by bringing air into contact with a chlorine-generating solution comprised of functional water (I) or functional water (II) having been fed into a chlorine generation region;

a decomposition step of decomposing the pollutants by bringing the air which contains chlorine and air which contains pollutants into contact with each other under irradiation by light in a decomposition treatment region;

a regeneration step of obtaining functional water (II) by regeneration by feeding as functional water waste liquor at least part of the chlorine-generating solution present in the chlorine generation region, to means for forming functional water by electrolysis; and a feed step of feeding to the chlorine generation region the functional water (II) obtained through the regeneration step;

the functional water (I) and functional water (II) being water capable of generating by aeration the air which contains chlorine, and the functional water (I) comprising a solution used for its formation which does not contain the functional water waste liquor and the functional water (II) comprising a solution used for its formation which contains the functional-water waste liquor at least in part.

The present invention also provides a pollutant decomposition system for decomposing pollutants by bringing pollutants contained in air into contact with air which contains chlorine, under irradiation by light, the system comprising:

a chlorine generation region into which a chlorine-generating solution comprising functional water (I) or functional water (II) is fed to bring it into contact with air to generate air which contains chlorine;

a decomposition treatment region into which the air which contains chlorine and air which contains pollutants are fed to bring them into contact with each other under irradiation by light to decompose the pollutants;

means for effecting irradiation by light;

means for forming functional water by electrolysis; and means for feeding at least part of the chlorine-generating solution to the means for forming functional water;

the functional water (I) and functional water (II) being water capable of generating by aeration the air which contains chlorine, and the functional water (I) comprising a solution used for its formation which does not contain the functional water waste liquor and the functional water (II) comprising a solution used for its formation which contains the functional water waste liquor at least in part.

The contact of the chlorine-generating solution with the air in the chlorine-containing air generation step may be the step of sending air to the surface of the chlorine-generating solution. In order to improve efficiency, it is preferable to use the step of enlarging the area of gas-liquid contact. To enlarge the area of gas-liquid contact, preferably usable is the step of jetting the chlorine-generating solution into air or subjecting the chlorine-generating solution to aeration.

According to the present invention, a pollutant decomposition process and a pollutant decomposition system used therefor can be provided by which pollutants such as organochlorine compounds can be decomposed efficiently, safely and simply in the gaseous phase under normal temperature and normal pressure, and the quantity of the electrolyte to be added and the quantity of waste water can be cut down.

DESCRIPTION OF THE PREFERRED EMBODIMENTS

Embodiments of the present invention are described below with reference to the accompanying drawings.

Embodiment 1

Figure 1:
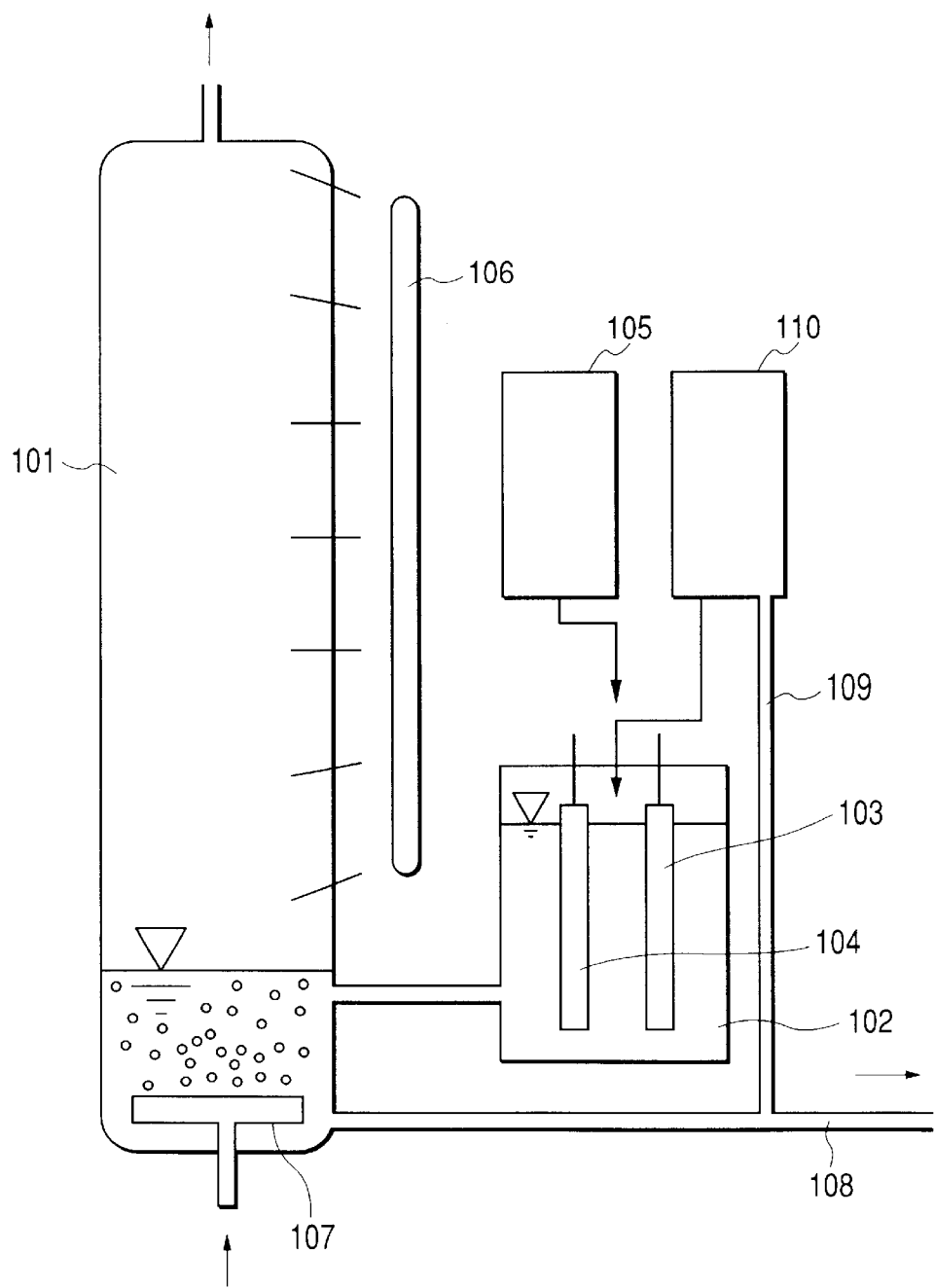
FIG. 1 is a schematic illustration for describing the basic construction of a first embodiment of the present invention.

FIG. 1 shows the basic construction of an embodiment of the pollutant decomposition system of the present invention.

In FIG. 1, reference numeral 102 denotes an electrolytic cell serving as a functional-water formation means, which is internally provided with the cathode 103 and the anode 104. Reference numeral 101 denotes a decomposition treatment tank having a chlorine generation region that has an air diffusion means 107 for aerating functional water kept at the bottom, and its decomposition treatment region is irradiated by light from a light irradiation means 106.

First, untreated water held fully in the electrolytic cell 102 is mixed with a high-concentration electrolyte solution fed from an electrolyte solution feed unit 105 to come into an aqueous electrolyte solution having a stated concentration. Not shown particularly in the drawing, a stirrer may be provided in the electrolytic cell 102, which is preferable because an aqueous electrolyte solution having a uniform concentration can be prepared in a short time by stirring the untreated water. In this state, the cathode 103 and the anode 104 are connected to a direct-current power unit (not shown) to carry out electrolysis for a certain time to obtain functional water (I). This water is supplied to the decomposition treatment tank 101 at one time in its entirety in the case of batch operation, or at a constant flow rate in the case of continuous operation.

The functional water (I) may also be prepared without relying on electrolysis and by adding hypochlorous acid or the like. In such a case, the necessary reagent may be added to the untreated water held fully in the electrolytic cell 102 to form functional water (I), which is then supplied to the decomposition treatment tank 101 at one time in its entirety in the case of batch operation, or at a constant flow rate in the case of continuous operation. In the case of batch operation, the untreated water may directly be supplied to the bottom of the decomposition treatment tank 101 through a water supply means (not shown) and then the necessary reagent may be added to form the functional water (I).

The functional water (I) supplied to the decomposition treatment tank 101 is aerated by the air diffusion means (aeration means) 107 provided in the chlorine generation region at the bottom portion of the decomposition treatment tank 101, so that the interior of the decomposition treatment tank 101 is filled with air that contains chlorine and the decomposition treatment region is formed. Here, the air supplied to the aeration means 107 may be air that does not contain any pollutants and air that contains pollutants may separately be supplied to the decomposition treatment region of the decomposition treatment tank 101. In such a case, the air that contains pollutants may be supplied to the aeration means 107 so that mixed air comprised of the air that contains chlorine and the air that contains pollutants may be formed in the decomposition treatment region in the decomposition treatment tank 101. This makes construction simple to some extent. Then, this mixed air may be irradiated by light from the light irradiation means 106 for a desired residence time, whereby the decomposition target substance is decomposed.

Functional water waste liquor having decreased in the amount of dissolved chlorine as a result of the aeration in the chlorine generation region inside the decomposition treatment tank 101 in the course of or after the desired decomposition reaction is discharged out of the chlorine generation region of the decomposition treatment tank 101 through a waste liquor pipe 108 at one time in its entirety in the case of batch operation, or at a constant flow rate in the case of continuous operation. Then, a part of all functional water waste liquor is returned to the electrolytic cell 102 through a functional water waste liquor flow-back pipe 109. Also, a storage tank 110 may optionally be provided in the course of the functional water waste liquor flow-back pipe 109 so that the functional water waste liquor can temporarily be stored.

In the case where it does not flow back in its entirety and partly flows out, new untreated water must be added to the electrolytic cell 102 in a quantity corresponding to that of the flow-out.

The functional water waste liquor in this embodiment may have a pH close to 4, depending on the pH of the original functional water and the feed of pollutants. This waste liquor may be returned to the decomposition treatment tank 101 and electrolyzed to form functional water (II), or may be neutralized and thereafter electrolyzed. In the case where the waste liquor is drained, it should be subjected to neutralization. As an aqueous alkaline solution used for such neutralization, an aqueous solution of an alkali reagent such as sodium hydroxide may be used. Not shown in the drawing, a means for mixing the alkali reagent in the functional water waste liquor while monitoring the pH may also additionally be provided in the course of the waste liquor pipe 108.

The functional water waste liquor returned to the electrolytic cell 102 is electrolyzed there, becoming functional water (II) regenerated as a source from which the air that contains chlorine is fed.

When the functional water (II) is formed, the functional water waste liquor may preferably be regulated in some cases to have a suitable electrolyte concentration. If the electrolyte concentration has already been in a proper range, such a regulation step may be omitted. A means may also be provided for feeding the electrolyte automatically while measuring the concentration of dissolved chlorine in the functional water present in the chlorine generation region at the bottom portion of the decomposition treatment tank 101 or measuring the concentration of electrolyte in the electrolytic cell 102 or storage tank 110. However, according to experiments conducted by the present inventors, it has been found that the decomposition power of the entire system does not decrease when the functional water waste liquor is returned and regenerated in a quantity about five times the quantity of the functional water in the system and is thereafter again added. Hence, it is possible to operate the system even if no means for regulating the electrolyte concentration are provided.

Then, the functional water waste liquor fed into this electrolytic cell 102 is electrolyzed to form functional water (II), which can again be used for the decomposition. This functional water (II) is further fed into the chlorine generation region of the decomposition treatment tank 101, and is aerated according to the same procedure as the above functional water (I) to generate the air that contains chlorine, where the mixed air thereof with the pollutants is again formed to carry out the decomposition under irradiation by light in the decomposition treatment region.

Subsequently, such steps of forming the functional water (II) in the electrolytic cell 102 and decomposing the pollutants in the decomposition treatment region inside the decomposition treatment tank 101 are repeated any desired numbers of times. This makes it possible to greatly cut down the total quantity of waste water and the quantity of the electrolyte to be added.

Figure 2:
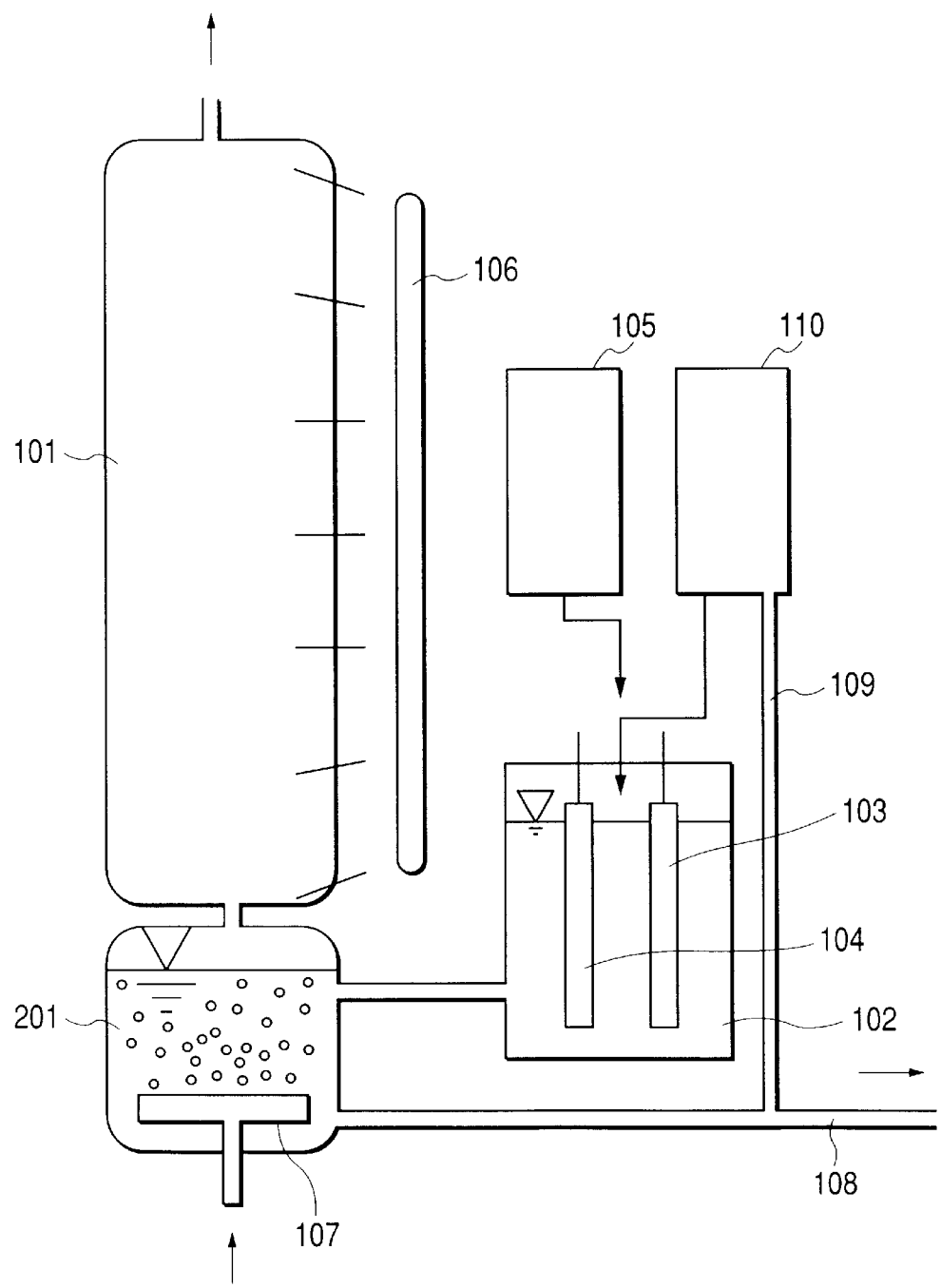
FIG. 2 is a schematic illustration for describing an example in which the basic construction of the first embodiment has been modified.

FIG. 2 shows a decomposition system partly modified from the system shown in FIG. 1. As shown in FIG. 2, the system may be so constructed that the chlorine generation region, which is the part where the functional water present at the bottom of the decomposition treatment tank 101 shown in FIG. 1 is aerated, is made independent as a functional water aeration tank 201 and the mixed air comprised of the air that contains chlorine and the air that contains pollutants, formed here, is sent to the decomposition treatment tank consisting of only the decomposition treatment region.

Not shown in the drawing, the system may also be so constructed that the air that contains pollutants is directly sent to any of the above two-type decomposition treatment tanks and the air that does not contain any pollutants is sent to the aeration means in the chlorine generation region to generate the air that contains chlorine, where the mixed air is formed to carry out decomposition under irradiation by light.

Embodiment 2

Figure 3:
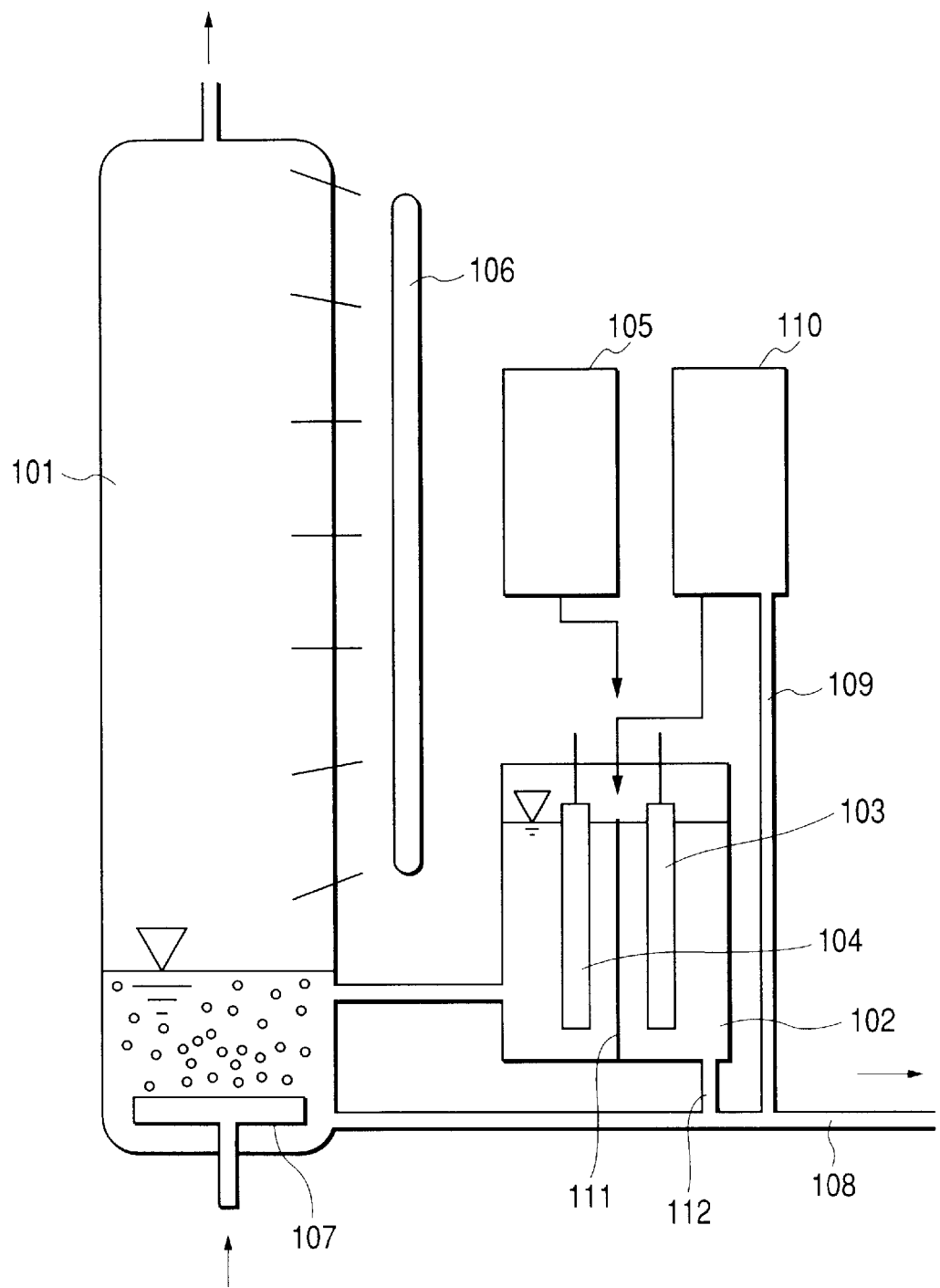
FIG. 3 is a schematic illustration for describing the basic construction of a second embodiment of the present invention.

FIG. 3 shows the basic construction of a second embodiment of the pollutant decomposition system of the present invention.

The system shown in FIG. 3 differs from the one shown in FIG. 1 in that the electrolytic cell 102 is provided therein with a diaphragm 111 and that the cathode 103 side in the electrolytic cell 102 communicates with the waste liquor pipe 108 through a pipe (alkaline-water pipe) 112 at the latter's part on the side upstream to the part where the waste liquor pipe 108 and the functional water waste liquor flow-back pipe 109 are joined. As the diaphragm 111, preferably usable is, e.g., an ion-exchange membrane.

In the case of the construction as shown in Embodiment 2, maintenance must be performed on for the diaphragm. Also, such a system has a complicated construction. However, because of such a construction, the acidic water formed in the vicinity of the anode 104 can be prevented from being mixed with the alkaline water formed in the vicinity of the cathode 103, so that functional water can be obtained, which has a higher concentration of dissolved chlorine and is capable of generating a large quantity of chlorine gas.

The functional water waste liquor in the present Embodiment may also have a pH close to 1, depending on the feed of pollutants. This waste liquor may be returned to the electrolytic cell 102 and electrolyzed to form functional water (II), or may be neutralized and thereafter electrolyzed. In the case where the waste liquor is drained, it should be subjected to neutralization. As an aqueous alkaline solution used for such neutralization, an aqueous solution of an alkali reagent such as sodium hydroxide may be used. The use of alkaline water formed on the cathode side when acidic water is formed is preferred because it is unnecessary to use any additional alkali agent or use any unit for feeding it. This alkaline water may also be supplied through the alkaline-water pipe 112 to the functional water waste liquor present in the waste liquor pipe 108 so as to be utilized for the neutralization.

Also, in Embodiment 2, the basic construction and procedure for the decomposition are the same as those in Embodiment 1. Also, in the case of Embodiment 2, like in Embodiment 1, the system may be so constructed that the decomposition treatment tank and the functional water aeration tank are separately provided and the functional water may be aerated with the air that does not contain any pollutants to generate the air that contains chlorine.

These steps may be repeated batch-wise any desired number times, or may be carried out continuously.

In both Embodiments, the decomposition target substance is air that contains pollutants, having been vacuum-extracted from polluted soil, or air that contains pollutants, obtained by aeration of underground water having been pumped up. Accordingly, the system may also be so constructed that hydrochloric acid, sodium chloride and sodium hypochlorite are added to pollutant-dissolved water such as underground water having been pumped up from polluted soil, to make up the functional water (I), which is then subjected to the aeration to form the mixed air of pollutants and chlorine to carry out the decomposition under irradiation by light.

Not shown in the drawing, the waste water may also be irradiated by light to effect decomposition when in both Embodiments the waste water is mixed with the pollutants at a concentration higher than the standard for waste water.

Pollutants to be Treated

Pollutants to be treated may include organochlorine compounds such as chloroethylene, 1,1-dichloroethylene, cis-1,2-dichloroethylene, trans-1,2-dichloroethylene, trichloroethylene, tetrachloroethylene, chloromethane, dichloromethane and trichloromethane.

Untreated Water Serving as Source for Functional Water

The untreated water may be any water so long as any substance that may adsorb chlorine gas does not stand included or any substance that may react with chlorine gas without irradiation by light does not stand dissolved. Where polluted underground water is purified, the underground water itself may be used as the untreated water so that the quantity of waste water can further be reduced. Since, however, there is a problem that the pollutants having dissolved therein may evaporate as a result of the rise of water temperature at the time of electrolysis to contaminate the air surrounding the system, it is preferable to add sodium hypochlorite or the like without relying on the electrolysis.

Functional Water (I) and (II) and Air that Contains Chlorine Formed Therefrom With regard to the mixing proportion of gaseous pollutants and the air that contains chlorine, in the decomposition treatment tank, it may preferably be so regulated that the chlorine concentration in the air is from 5 ppm to 1,000 ppm. Especially when the chlorine concentration is from 20 ppm to 500 ppm, and further from 80 ppm to 300 ppm, which may differ depending on the concentration of the substance to be treated, the substance to be treated can be decomposed with an especially remarkable efficiency.

In the present invention, the functional water is brought into contact with the air to generate the air that contains chlorine that is necessary for the decomposition. The part where the functional water is subjected to aeration, which is one of preferred methods of contact, functions as a feeder of chlorine basically necessary for the decomposition. The gas-phase reaction, which takes place subsequently in the decomposition treatment tank, is the principal site of the decomposition reaction. Hence, in the case where the generation of chlorine and the decomposition reaction are unified, as shown in FIG. 1 or 3, the proportion of the gas-phase portion to the liquid-phase portion has a great influence on the decomposition power. More specifically, the quantity of chlorine that can be fed increases with an increase in the volume of the functional water, but the gas-phase portion decreases and the reaction zone of decomposition also decreases. Conversely, the site of the reaction increases with an increase in the gas-phase portion and the decomposition reaction proceeds quickly, but the feed of chlorine decreases because of a decrease in the liquid-phase portion. There are various factors that affect this process, such as the rate of aeration and the feed speed of functional water. In the case where the formation of the air that contains chlorine and the decomposition reaction region (reaction region) are unified, as shown in FIG. 1 or 3, the liquid-phase portion in the treatment tank may be from 5% to 30%, and preferably from 10% to 20%. Also, in the case where they are not unified, as shown in FIG. 2, the proportion of the volume of the tank in which the air that contains chlorine is formed to the volume of the tank in which the decomposition reaction is carried out may also preferably be approximately from 1:2 to 1:9.

Here, the functional water (I) and (II) serving as the source from which the air that contains chlorine is fed refer to, e.g., water having properties such that its hydrogen ions are at a concentration (pH value) from 1 to 4, and preferably from 2 to 3, and dissolved chlorine is at a concentration from 5 mg/L to 150 mg/L, and preferably from 30 mg/L to 120 mg/L.

Such functional water, in particular functional water (II), which is the regenerated functional water, can be obtained by dissolving an electrolyte such as sodium chloride or potassium chloride in the untreated water and electrolyzing this water in a water tank having a pair of electrodes, being obtained in the vicinity of the anode thereof. Here, the electrolyte in the untreated water before electrolysis may preferably be at a concentration of, in the case of, e.g., sodium chloride, from 20 mg/L to 2,000 mg/L, and more preferably from 200 mg/L to 1,000 mg/L.

Here, in the case where the diaphragm is provided between a pair of electrodes, the acidic water formed in the vicinity of the anode can be prevented from being mixed with the alkaline water formed in the vicinity of the cathode. As the diaphragm, preferably usable is, e.g., an ion-exchange membrane. Then, as a means for obtaining such functional water, any commercially available generator for strongly acidic electrolytic water may be used, as exemplified by OASIS BIOHALF (trade name; manufactured by Asahi Glass Engineering Co., Ltd.) and Strong Electrolytic Water Generator Model FW-200 (trade name; manufactured by Amano K.K.).

Functional water formed from a system having no diaphragm may also be used as the functional water described above. For example, it is functional water having the dissolved chlorine concentration from 2 mg/L to 100 mg/L, preferably from 20 mg/L to 80 mg/L, and having a pH from 4 to 10, preferably from 5 to 8.

The functional water having the above properties may be obtained not only by electrolysis, but may also be prepared by dissolving various reagents in the untreated water. For example, it may be prepared by dissolving 0.001 mol/L to 0.1 mol/L of hydrochloric acid, 0.005 mol/L to 0.02 mol/L of sodium chloride and 0.0001 mol/L to 0.01 mol/L of sodium hypochlorite. The functional water thus prepared is used as functional water put previously in the decomposition treatment tank as the functional water (I) at the time of the start of the decomposition, or used when the underground water that contains pollutants is converted to functional water and supplied to the decomposition treatment tank.

Functional water having a pH of 4 or above may also be obtained not only by electrolysis, but may also be prepared by dissolving various reagents in the untreated water. For example, it may be prepared by dissolving 0.001 mol/L to 0.1 mol/L of hydrochloric acid, 0.001 mol/L to 0.1 mol/L of sodium hydroxide and 0.0001 mol/L to 0.01 mol/L of sodium hypochlorite. Alternatively, it may also be prepared by dissolving only a hypochlorite, e.g., 0.0001 mol/L to 0.01 mol/L of sodium hypochlorite. Functional water having a pH of 4.0 or below and having the dissolved chlorine concentration from 2 mg/L to 2,000 mg/L may also be prepared using the hydrochloric acid and hypochlorite.

In place of the hydrochloric acid, other inorganic acid or organic acid may be used. As the inorganic acid, usable are, e.g., hydrofluoric acid, sulfuric acid, phosphoric acid and boric acid. As the organic acid, e.g., acetic acid, formic acid, malic acid, citric acid and oxalic acid maybe used. The functional water may also be produced using, e.g., $N_3C_3O_3NaCl_2$, commercially available as a weak acidic water generating powder (e.g.,trade name: Kino-san 21X; available from Clean Chemical K.K). The functional water prepared using such chemicals also has the ability to decompose organochlorine compounds under irradiation by light like the functional water obtained by electrolysis, though having a difference in decomposition power as is apparent from the Examples. Here, the untreated water may include city water, river water and sea water. These types of water usually have a pH in the range from 6 to 8 and the dissolved chlorine concentration of, at most, less than 1 mg/L. Such untreated water does not have the above ability to decompose pollutants as a matter of course.

The chlorine necessary for the decomposition can be generated from all of these types of water, and any of these and the treatment target gas may be mixed, followed by irradiation by light so as to be used in the present invention, which decomposes the treatment target pollutants.

Light Irradiation Means

As a light irradiation means usable in the present invention, light have a wavelength, e.g., from 300 to 500 nm is preferred, and the use of light from 350 to 450 nm is more preferred. Also, as light irradiation intensity for the functional water and treatment target, in the case of, e.g., a light source having a peak around 360 nm, decomposition sufficient for practical use proceeds at an intensity of hundreds of $\mu W/cm^2$ (measured between 300 nm and 400 nm). Stated specifically, the irradiation may be performed in an amount of light from 10 $\mu W/cm^2$ to 10 $mW/cm^2$, and preferably from 50 $\mu W/cm^2$ to 5 $mW/cm^2$.

Then, as a light source of such light, natural light (e.g., sunlight) or artificial light (e.g., a mercury lamp, a black light and a color fluorescent lamp) may be used.

In the present invention, it is unnecessary to use ultraviolet light of about 250 nm or shorter wavelength. Hence, it is also neither necessary to provide any safety device so that human bodies are not affected, nor is it necessary to construct the decomposition treatment tank using quartz glass through which the ultraviolet light can readily pass. Thus, the system can be set up at a low cost.

Means for Generating Air that Contains Chlorine

As a means for generating the air that contains chlorine, any device may be used that brings the functional water and the air into contact with each other, e.g., which sends the air to the surface of the functional water. In order to improve efficiency, it is more advantageous to use a device that can ensure a large gas-liquid contact area. As a means for ensuring such a large contact area, preferred are a means for jetting the functional water in the air in the form of droplets and a means for aerating the functional water.

These devices may be made of any materials, so long as they are not corroded by the treatment target and chlorine. For example, usable are a porous diffusion plate made of sintered glass, porous ceramic, sintered SUS316 stainless steel or a net woven with fibrous SUS316 stainless steel, and a sparger nozzle shower head made of pipes of glass, ceramic or SUS316 stainless steel.

EXAMPLES

The present invention is described below in greater detail by the following Examples. These Examples by no means limit the present invention.

Example 1

Batch operation of a single-unit type decomposition treatment tank, without a diaphragm:

The same decomposition system as the system shown in FIG. 1, but having the storage tank 110 removed therefrom, was made ready for use. The electrolytic cell 102 was so set up as to be able to electrolyze about 50 ml of water through a platinum electrode.

First, the functional water (I) was prepared in the following way using the electrolytic cell 102.

The electrolyte concentration of water containing sodium chloride as an electrolyte, the electrolysis electric-current value, the electrolysis time and so forth were changed in variety, and the pH of the resultant acidic functional water obtained on the anode side was measured with a pH meter (TCX-90i). The concentration of dissolved chlorine was also measured with a simplified reflection photometer (trade name: RQ flex; manufactured by Merck & Co., Inc.; test paper: Reflectoquant chlorine test paper).

As a result of this measurement, it was ascertained that the pH of this functional water changed from 4.0 to 10.0 and the concentration of dissolved chlorine from 2 mg/L to 70 mg/L, depending on the concentration of sodium chloride (standard concentration: 1,000 mg/L), the electrolysis electric-current value, the electrolysis time and so forth.

Accordingly, as the functional water (I) used in the present Example, functional water having a pH of 7.9 and having the dissolved chlorine concentration of 15 mg/L was used. This functional water (I) was water obtained by putting 50 mL of distilled water in the electrolytic cell 102, and adding thereto from the electrolyte solution feed unit 105 2 mL of an aqueous sodium chloride solution having a concentration of 20% (250 g/L) to form an aqueous solution of about 1,000 mg/L of sodium chloride, followed by electrolysis for 12 minutes. Next, 50 mL of the functional water (I) was put into a 500 mL volume decomposition treatment tank 101 made of glass.

In an experiment conducted previously, this functional water (I) was put into the decomposition treatment tank 101, shown in FIG. 1, and air was sent to the aeration means 107 at a flow rate of 300 mL/min. by means of an air pump. Here, the concentration of chlorine in the gaseous phase portion in the decomposition treatment tank 101 was measured with a detecting tube (manufactured by GASTEC CORPORATION K.K., No. 8H) several times. As a result, this concentration was in the range from 80 ppm to 300 ppm, but gradually decreased.

The gaseous phase portion of this decomposition treatment tank 101 was irradiated by light by means of a black light fluorescent lamp (trade name: FL10BLB; manufactured by Toshiba Corporation; 10 W), which is the light irradiation means 106. This irradiation was made using an amount of light from 0.4 to 0.7 $mW/cm^2$.

Simultaneously with the irradiation by light, air containing TCE and PCE at a concentration of 100 ppm imitated polluted air vacuum-extracted from polluted soil formed using a permeator (manufactured by GASTEC CORPORATION K.K.) was sent at a flow rate of 300 mL/min. from the aeration means 107 provided at the bottom of the decomposition treatment tank 101.

For 30 minutes after this system began to operate, the concentration of TCE and PCE in the air exhausted from the decomposition treatment tank 101 was periodically checked by sampling using a gas-tight syringe. The concentration of TCE and PCE was measured by gas chromatography (using GC-14B, trade name; manufactured by Shimadzu Corporation and having an FID detector; column: DB-624, available from J & W K.K.). However, neither of these compounds was always detectable. The concentration of TCE and PCE in the functional water was also measured in the same way after the treatment was completed, but neither compound was detectable. This showed that the TCE and PCE were decomposable.

Next, all functional water waste liquor at the bottom of the decomposition treatment tank 101 was completely removed and returned to the electrolytic cell 102 through the functional water waste liquor flow-back pipe 109 to effect electrolysis again for 12 minutes. As a result, functional water (II) having a pH of 2.3 and having the dissolved chlorine in a concentration of 27 mg/L was formed.

This functional water (II) was poured into the decomposition treatment tank 101, where the black light fluorescent lamp was again turned on, and simultaneously aerated with the air containing TCE and PCE. In this treatment, too, the concentration of chlorine in the gaseous phase portion in the decomposition treatment tank 101 and the concentration of TCE and PCE in the exhaust air were periodically measured, but neither compound was always detectable.

This operation was carried out five times or more, but the TCE and PCE was included in the exhaust air only starting on the 6th operation. Accordingly, the decomposition was stopped, and the functional water was fed back to the decomposition treatment tank 101. Then, after 2 mL of an aqueous sodium chloride solution were added from the electrolyte solution feed unit 105, the electrolysis was again carried out for 12 minutes. Thereafter, the functional water formed was again supplied to the decomposition treatment tank 101, followed by aeration under irradiation by light from the lamp. As a result, the TCE and PCE were not detectable.

From this fact, it has been ascertained that the electrolyte may be added once in every five operations when the functional water waste liquor is returned batch-wise, whereby the TCE and PCE can be continuously decomposed while the functional water waste liquor having been aerated is electrolyzed and regenerated into the functional water (II), which is again utilized as the feed source of the air that contains chlorine.

Example 2

Continuous operation of single-unit type decomposition treatment tank without a diaphragm:

The same decomposition system as the system shown in FIG. 1, but having the storage tank 110 removed therefrom was made ready for use.

50 mL of functional water (I) formed in the same manner as in Example 1 was put into the decomposition treatment tank 101. Subsequently, 50 mL of an aqueous sodium chloride solution having a concentration of 1,000 mg/L were put into the electrolytic cell 102 to effect electrolysis, during which the functional water was supplied from the electrolytic cell 102 at a flow rate of 2 mL/min. by means of a pump. Also, the aerated functional water waste liquor was drained off at the same rate so as to be completely returned to the electrolytic cell 102 and so that the quantity of the functional water in the decomposition treatment tank 101 and electrolytic cell 102 was constant.

In an experiment made previously, air was sent to the aeration means 107 at a flow rate of 300 mL/min. by means of an air pump while the functional water was circulated between the decomposition treatment tank 101 and the electrolytic cell 102. Here, the concentration of chlorine in the gaseous phase portion in the decomposition treatment tank 101 was measured with a detecting tube (manufactured by GASTEC CORPORATION K.K., No. 8H) several times. As a result, the concentration was in the range from 80 ppm to 300 ppm at the beginning, but gradually increased.

This decomposition treatment tank 101 was irradiated by light from a black light fluorescent lamp and, simultaneously, the air containing TCE and PCE at a concentration of 100 ppm was sent at a flow rate of 300 mL/min., in the same manner as in Example 1.

For about 4 hours after this system began to be operate, the concentration of TCE and PCE in the air exhausted from the decomposition treatment tank 101 was periodically checked by sampling using a gas-tight syringe, and the concentration of TCE and PCE was measured in the same manner as in Example 1. However, neither compound was always detectable. This showed that the TCE and PCE were decomposable only by again electrolyzing the functional water waste liquor into the functional water (II) followed by aeration when the functional water is circulated five times through the system.

After that, however, the TCE and PCE was detectable in the exhaust air. Accordingly, 4 mL of an aqueous sodium chloride solution were gradually added to the electrolytic cell 102 from the electrolyte solution feed unit 105 over a period of about 30 minutes. As a result, the TCE and PCE became undetectable.

From this fact, it has been ascertained that the electrolyte may be added every time the water in the system is circulated five times when the functional water waste liquor is continuously returned. Whereby, the TCE and PCE can be continuously decomposed while the functional water waste liquor, having been aerated, is electrolyzed and regenerated into the functional water (II), which is again utilized as the feed source of the air that contains chlorine.

Example 3

Batch operation of separation type decomposition treatment tank without a diaphragm:

Using the same decomposition system as the system shown in FIG. 1, except that the functional water aeration tank 201 was separate from the decomposition treatment tank 101, an experiment was conducted in the same manner as in Example 1. Here, the functional water aeration tank 201 was 70 mL in volume, and 50 mL of functional water was put into it. Also, the decomposition treatment tank 101 was 450 mL in volume.

As a result, entirely the same results as those in Example 1 were obtained.

From this fact, it has been ascertained that even when the functional water aeration tank 201 is separate from the decomposition treatment tank 101, the electrolyte may be added every time the water in the system is circulated five times when the functional water waste liquor is returned batch-wise. Whereby, the TCE and PCE can be continuously decomposed while the functional water waste liquor, having been aerated, is electrolyzed and regenerated into the functional water (II), which is again utilized as the feed source of the air that contains chlorine.

Example 4

Batch operation of aeration type decomposition treatment tank using air not containing any pollutants without a diaphragm:

Using the same decomposition system as the system shown in FIG. 1, except that the polluted air from the permeator was directly sent to the decomposition treatment tank 101 and 300 mL/min. of the air not containing any pollutants was sent to the aeration means 107 provided at the bottom of the decomposition treatment tank 101, at a flow rate of 300 mL/min. by means of an air pump, an experiment was conducted in the same manner as in Example 1.

As a result, entirely the same results as those in Example 1 were obtained.

From this fact, it has been ascertained that even when the functional water is aerated with the air not containing any pollutants to form the air that contains chlorine, which is then mixed with pollutants in the decomposition treatment tank 101, the electrolyte may be added every time the water in the system is circulated five times when the functional water waste liquor is returned batch-wise. Whereby, the TCE and PCE can be continuously decomposed while the functional water waste liquor, having been aerated, is electrolyzed and regenerated into the functional water (II), which is again utilized as the feed source of the air that contains chlorine.

Example 5

Batch operation of single-unit type decomposition treatment tank with a diaphragm:

An experiment was conducted using a system in which, as shown in FIG. 3, the diaphragm 111 was attached to the electrolytic cell 102 and the alkaline-water pipe 112 was provided on the cathode side.

In the same manner as in Example 1, the electrolyte concentration of water containing sodium chloride as an electrolyte, the electrolysis electric-current value, the electrolysis time and so forth were changed in variety, and the pH and the concentration of the dissolved chlorine of the resultant acidic functional water obtained on the anode side were measured with a pH meter (TCX-90i).

As a result of this measurement, it was ascertained that the pH of this functional water changed from 1.0 to 4.0 and the concentration of dissolved chlorine from 5 mg/L to 150 mg/L, depending on the concentration of sodium chloride (standard concentration: 1,000 mg/L), the electrolysis electric-current value, the electrolysis time and so forth.

Accordingly, as the functional water (I) used in the present Example, functional water having a pH of 2.1 and having a dissolved chlorine concentration of 60 mg/L was used. This functional water (I) was 50 mL of acidic electrolytic water obtained on the side of the anode 104 by putting 100 mL of distilled water in the electrolytic cell 102 and adding thereto from the electrolyte solution feed unit 105 4 mL of an aqueous sodium chloride solution having a concentration of 20% (250 g/L), to form an aqueous solution of about 1,000 mL of sodium chloride, followed by electrolysis for 12 minutes.

This functional water (I) was supplied to the decomposition treatment tank 101 in the same manner as in Example 1, and an experiment was made in the same manner as in Example 1, except that the concentration of the air containing TCE and PCE was doubled to 200 ppm. With regard to the functional water waste liquor, it was neutralized in the functional water waste liquor flow-back pipe 109 by supplying from the alkaline-water pipe 112 50 mL of alkaline water formed on the side of the cathode of the electrolytic cell 102, thereafter temporarily stored in the storage tank 10 and then returned to the electrolytic cell 102. Here, the pH of the functional water waste liquor having not been neutralized was 2.3. After neutralization, it was 6.8.

As a result, entirely the same results as those in Example 1 were obtained.

From this fact, it has been ascertained that even when the functional water formed in the electrolytic cell having a diaphragm is used, the electrolyte may be added every time the water in the system is circulated five times when the functional water waste liquor is returned batch-wise. Whereby, the TCE and PCE can be continuously decomposed while the functional water waste liquor, having been aerated, is electrolyzed and regenerated into the functional water (II), which is again utilized as the feed source of the air that contains chlorine.

Example 6

Batch operation of single-unit type decomposition treatment tank, using functional water with a hypochlorite:

An experiment was conducted in the same manner as in Example 5, except that 50 mL of functional water (I) formed by adding hydrochloric acid, sodium chloride and sodium hypochlorite were put into the decomposition treatment tank 101 at the time the experiment was started.

The functional water (I) was prepared by adding to distilled water the hydrochloric acid, sodium chloride and sodium hypochlorite so as to be at concentrations of 0.006 mol/L, 0.01 mol/L and 0.002 mol/L, respectively. Here, the functional water (I) had a pH of 2.3 and had the dissolved chlorine concentration of 110 mg/L.

This functional water (I) was supplied to the decomposition treatment tank 101 in the same manner as in Example 5, and an experiment was conducted in the same manner as in Example 5, except that sodium chloride was added to the returned functional-water waste liquor from the electrolyte solution feed unit 105 so as to be at a concentration of 1,000 mg/L and thereafter the electrolysis was carried out.

As a result, quite the same results as those in Example 1 were obtained, except that the TCE and PCE were detectable in the exhaust air when the functional water (II) formed after the functional water waste liquor was returned seven times to effect electrolysis repeatedly was used.

From this fact, it has been ascertained that even when the functional water with a hypochlorite is used, the electrolyte may be added every time the water in the system is electrolyzed six times to regenerate the functional water (II). Whereby, the TCE and PCE can be continuously decomposed, while the aerated functional water waste liquor is electrolyzed and regenerated into the functional water (II), which is again utilized as the feed source of the air that contains chlorine.

What is claimed is:

1. An apparatus for decomposing a pollutant comprising:
    a container for containing a chlorine-generating solution;
    a supply means for supplying the chlorine-generating solution to the container;
    a chlorine-generating means for generating chlorine from the chlorine-generating solution contained in the container;
    a light source for irradiating the pollutant mixed with the chlorine; and
    a flow-back means for flowing, from the container to the supply means, the chlorine-generating solution from which the chlorine is being generated or from which the chlorine has already been generated,
    wherein the supply means adjusts the chlorine-generating solution returned from the container and supplies the adjusted chlorine-generating solution to the container.

2. The apparatus according to claim 1, wherein the chlorine-generating means generates chlorine by introducing a gas to the chlorine-generating solution.

3. The apparatus according to claim 1, further comprising a neutralizing means for neutralizing the chlorine-generating solution returned from the container.

4. The apparatus according to claim 1, wherein (i) the supply means is an electrolytic apparatus in which a space for containing the chlorine-generating solution is divided by an ion-exchange membrane into a first space and a second space; (ii) the first space is provided with an anode; (iii) the second space is provided with a cathode; and (iv) the anode and the cathode are connected to a power source.

5. The apparatus according to claim 4, wherein the chlorine-generating solution is an acidic water that is electrolyzed and is contained in the first space.

6. The apparatus according to claim 4, wherein the chlorine-generating solution returned from the container is neutralized with an alkaline water contained in the second space.

7. The apparatus according to claim 1, further comprising an absorbing means for absorbing an air containing the pollutant from soil.

8. The apparatus according to claim 1, further comprising an obtaining means for obtaining a gaseous pollutant from underground water.

9. The apparatus according to claim 1, wherein the pollutant is an organochlorine compound.

10. The apparatus according to claim 1, wherein the chlorine-generating solution contains an inorganic acid and/or an organic acid.

11. The apparatus according to claim 1, wherein a wavelength of the light for irradiation is from 350 nm to 450 nm.

12. The apparatus according to claim 1, wherein the chlorine-generating solution is a hypochlorous acid aqueous solution and/or a hypochlorite aqueous solution.

* * * * *

UNITED STATES PATENT AND TRADEMARK OFFICE
CERTIFICATE OF CORRECTION

PATENT NO.    : 6,699,370 B2
DATED         : March 2, 2004
INVENTOR(S)   : Akira Kuriyama et al.

It is certified that error appears in the above-identified patent and that said Letters Patent is hereby corrected as shown below:

Column 4,
Line 47, "of all" should read -- of or all --.

Column 6,
Line 11, "for" should be deleted.

Column 8,
Line 49, "other" should read -- another --.

Column 9,
Line 8, "have" should read -- having --.

Column 11,
Line 62, "be" should be deleted.

Column 14,
Line 61, "membrance" should read -- membrane --.

Signed and Sealed this

Twenty-seventh Day of July, 2004

JON W. DUDAS
*Acting Director of the United States Patent and Trademark Office*